US009631676B2

United States Patent
Simons et al.

(10) Patent No.: US 9,631,676 B2
(45) Date of Patent: Apr. 25, 2017

(54) TRIPOD JOINT HAVING LOW VIBRATION INDUCING FORCES

(75) Inventors: Karl-Heinz Simons, Merzenich (DE); Michael Eling, Köln (DE); Achim Boos, Lohmar (DE)

(73) Assignee: NEAPCO EUROPE GMBH, Duren (DE)

( * ) Notice: Subject to any disclaimer, the term of this patent is extended or adjusted under 35 U.S.C. 154(b) by 0 days.

(21) Appl. No.: 14/122,034

(22) PCT Filed: Jun. 29, 2012

(86) PCT No.: PCT/EP2012/002756
§ 371 (c)(1),
(2), (4) Date: Apr. 28, 2014

(87) PCT Pub. No.: WO2013/000581
PCT Pub. Date: Jan. 3, 2013

(65) Prior Publication Data
US 2014/0309043 A1    Oct. 16, 2014

(30) Foreign Application Priority Data

Jun. 30, 2011   (DE) .................. 10 2011 078 398

(51) Int. Cl.
*F16D 3/205* (2006.01)
*F16D 3/202* (2006.01)

(52) U.S. Cl.
CPC .... *F16D 3/2055* (2013.01); *F16D 2003/2023* (2013.01); *Y10S 464/905* (2013.01)

(58) Field of Classification Search
CPC ........... F16D 3/2055; F16D 2003/2023; Y10S 464/905

(Continued)

(56) References Cited

U.S. PATENT DOCUMENTS 4,768,990 A      9/1988  Farrell et al.
5,167,583 A  *  12/1992  Bensinger et al. ........... 464/111
(Continued)

FOREIGN PATENT DOCUMENTS

DE      4130183 A1     3/1993
DE     10206733 A1     8/2002
(Continued)

OTHER PUBLICATIONS

Free Slip Drive Assembly for Telescopic Tripot Universal Joints, Research Disclousre, Mason Publications, Hampshire GB, No. 312, Apr. 1, 1990, p. 293, XP000104601.
(Continued)

*Primary Examiner* — Gregory Binda
(74) *Attorney, Agent, or Firm* — Cantor Colburn LLP

(57) ABSTRACT

A tripod joint including an outer joint member with several axially extending elongate tracks; an inner joint member with several radial axle journals distributed over the outer circumference thereof; at least a number of rollers corresponding to the number of axle journals, where the roller is respectively pivotably retained with a central bore on the associated axle journal and is in engagement with the elongate tracks, where the roller is accommodated in the associated track so as to be displaceable in the axial direction of the outer joint member; where each axle journal includes on its circumference two outer diametrically opposed spherical end faces for engagement into the bore, where the bore has a cylindrical portion for engagement with the spherical end faces in order to support the roller so as to be displaceable relative to the journal, and at least a constricted portion that is adjacent thereto in the axial direction, while forming a continuous transition, on one side of the cylindrical portion, and that reaches behind the spherical end faces, for limiting the displacing movement.

10 Claims, 4 Drawing Sheets

(58) Field of Classification Search
USPC .................................. 464/111, 123, 124, 905
See application file for complete search history.

(56) References Cited

U.S. PATENT DOCUMENTS

| | | | |
|---|---|---|---|
| 6,375,576 B1 * | 4/2002 | Margerie | 464/111 |
| 6,572,481 B1 * | 6/2003 | Margerie | 464/111 |
| 6,958,016 B2 * | 10/2005 | Hofmann | 464/111 |

FOREIGN PATENT DOCUMENTS

| | | |
|---|---|---|
| DE | 102009000561 A1 | 8/2010 |
| FR | 2738881 A1 | 3/1997 |

OTHER PUBLICATIONS

International Search Report for corresponding application PCT/EP2012/002756 filed Jun. 29, 2012; Mail date Oct. 17, 2012.

* cited by examiner

TRIPOD JOINT HAVING LOW VIBRATION INDUCING FORCES

TECHNICAL FIELD

The subject matter of the present invention is a tripod joint for a motor vehicle as well as a method for producing a tripod joint.

BACKGROUND

Tripod joints, which are also referred to as "constant velocity universal joints" (abbreviated CV joints) or also as "homokinetic joints" have long been known from the prior art. For example, they are used as internal joints for the drive shafts of front-wheel driven motor vehicles. They exhibit excellent constant-velocity properties and can be bent to angles of typically more than 10°. Furthermore, tripod joints can advantageously also be used for cardan shafts of rear-wheel driven or four-wheel driven motor vehicles. However conventional tripod joints are problematic if the shafts are bent in an articulated manner relative to one another, i.e. if they form a working angle. Particularly in such a case it is important to avoid a relative sliding regarding the components that are in a rolling or roller contact. On the one hand, the friction resistance accompanying this sliding leads to increased wear and increased power dissipation of the joint and, on the other hand, harbors the risk of the joint shaking. This not only reduces the life of the bearings of the shafts interconnected by the joints, but also affects the running smoothness of the vehicle.

Great efforts are being made to improve the running characteristics of tripod joints. For example, DE 41 301 83 A1 discloses a tripod joint in which a tilting of the outer ring in the track, e.g. in the case of a load introduction or change of a load, is supposed to be avoided by means of a special design of the tracks in the outer joint member and of the outer rings of the rollers. This rolling contact between the roller and the track of the outer joint member is not the subject matter of the present invention.

Other issues which are the subject matter of the present invention are the rolling contacts between the axle journal, hereinafter also referred to in short as journal, of the inner joint portion and the roller as well as the roller contacts of the components of the roller, which is usually configured as a roller bearing with an inner ring, an outer ring and several rolling elements.

For example, DE 102 06 733 A1 proposes a spherical-to-spherical contact surface between the journal and the roller, or the inner ring thereof, since it was assumed that the friction and thus the shaking would be reduced by a distribution of the Hertzian stress over as large a contact surface as possible. Surprisingly, however, the inventors of the present invention have found that the shaking increases due to this measure, i.e., that the vibration-inducing forces appear to increase.

BRIEF SUMMARY

The invention provides a tripod joint with advantageous running characteristics, particularly with minimal shaking. Furthermore, a method for producing an advantageous tripod joint is to be specified. It is to be noted that the features cited individually in the patent claims can be combined in any technologically meaningful manner and present other embodiments of the invention. The description, in particular in connection with the figures, additionally characterizes and specifies the invention.

The tripod joint according to the invention comprises an outer joint member, also referred to as tulip, with several axially extending elongate tracks formed therein and distributed over the inner circumference thereof. The tracks are, for example, incorporated as recesses into the inner wall of the outer joint member. The joint according to the invention, also referred to as tripod star, comprises an inner joint member with several, preferably three, circumferentially distributed radial axle journals. The joint according to the invention further comprises at least a number of rollers corresponding to the number, wherein the roller is respectively pivotably retained with a central bore on the associated axle journal and is in engagement with the elongate tracks of the outer joint member, wherein the roller is accommodated in the associated track so as to be displaceable in the axial direction of the outer joint member. The pivotability of the roller ensures that the roller maintains its orientation in the track of the outer joint member with respect to the track when the joint is bent and rotating and during its oscillation back and forth, which is the result of its bent state. According to the invention, the rolling surfaces of the tracks and of the rollers can be configured in any way. It is the responsibility of the person skilled in the art to select in this case the suitable configuration that is familiar from the prior art and that meets the requirements. "Axial" or "axial direction" relates to the corresponding axis of rotation of, for example, the outer joint member or of the inner joint member as well as of the roller.

Preferably, each axle journal comprises on its circumference two outer diametrically opposed spherical end faces for engagement into the bore of the roller. According to the invention, moreover, it is to be provided that the bore has a cylindrical portion for engagement with the spherical end faces in order to support the roller so as to be displaceable relative to the journal. A constricted portion reaching behind the spherical end faces to limit the displacing movement is provided in the axial direction of the bore on at least one side of the cylindrical portion and adjacent thereto. The constricted portion means a tapering of the bore. For example, the tapered portion is provided on the side of the cylindrical portion facing towards the center of the inner joint portion, in order to prevent the separation of the roller from the axle. Alternatively, or preferably additionally, another constricted portion is provided on the, in the axial direction of the bore, opposite side of the cylindrical portion in order to limit the displacing movability of the roller in this direction and in order to prevent, for example, the roller from losing touching contact with the spherical end faces of the journal. The limitation of the displacement thus not only serves for a facilitated assembly but also serves for maintaining the arrangement conditions during the operation of the joint.

According to the invention, it is furthermore provided that a continuous transition from the cylindrical portion to the constricted portion is provided in the axial direction of the bore. A cylindrical/spherical contact surface is provided in the cylindrical portion. The continuous transition provides for a reduction of wear. As described above, the constricted portion serves for limiting the displacement of the roller relative to the journal. Despite the distance limitation, which is advantageous with regard to the design, a continuous, i.e. smooth, transition prevents the occurrence of high Hertzian stresses at discontinuous locations, such as sharp-angled edges and the like.

Preferably, concavely curved, particularly preferably, spherical surface-shaped constricted regions have proved to be particularly wear-reducing. For example, the radius of curvature approximately corresponds to that of the spherical end faces of the axle journals.

According to a preferred embodiment, the roller comprises an outer ring, an inner ring having the bore, and rolling elements interposed therebetween, wherein the outer ring is displaceable relative to the inner ring in the axial direction of the bore. Thus, an additional displaceability is provided besides the translational displaceability. This telescoping displacement has proved to be particularly advantageous in the prevention of shaking, particularly in the case of a bent joint.

Particularly advantageous is an embodiment in which the maximum possible displacement of the rolling elements in the axial direction (relative to their rolling movement) relative to the inner ring is smaller than the maximum possible displacement of the rolling elements in the axial direction (relative to their rolling movement) relative to the outer ring. Preferably, the play of the rolling elements in the axial direction on the inner ring is limited to the minimum extent that is required for the rotary movement and/or that is due to processing.

Due to the small dimensions in the radial direction that results therefrom, the rolling elements are needles, wherein the movement of the needles in the axial direction relative to their rolling movement is limited by collar-like projections on the inner ring and/or the outer ring. In the two-stage telescope-like displacement, i.e. on the one hand between the journal and the inner ring as the first stage, and, on the other hand, between the outer ring and the inner ring as the second stage, the needles have that the rather more line-shaped touching contact created by the needles has a larger frictional resistance as compared to the point-shaped touching contact between the journal and the inner ring. As the bend increases, the displacement thus takes place in the sequence of the two stages. That is, in the case of a low degree of bending and the particularly critical phase with respect to the vibration inducement during the use in the vehicle, the displacement takes place primarily between the inner ring and the journal. Only when its limitation caused by the constricted portion is reached does a displacement of the outer ring relative to the inner ring occur. Because the rotational speeds applied in the vehicle are, as a rule, smaller in the case the joint is bent in such a way, the vibration inducement is in this case less critical, anyway.

In order to minimize the risk of a vibration inducement due to the rolling movement of the rolling elements, the collar-like projections preferably form in the center of the axial end faces of the needles a contact surface therewith. Preferably, the end faces of the needles have a convex shape.

Preferably, the journal comprises flattened portions in each case in the circumferential direction between the spherical end faces; thus, the roller can easily be placed on the journal, if possible without any required deformation of the journal and/or the inner ring, for example by a pivoting movement.

Preferably, the tripod joint in one of the above-described embodiments is used in a motor vehicle. Due to the low vibration inducement resulting from the design according to the invention, it is used, for example, as an internal joint for the drive shafts of front-wheel driven motor vehicles, for cardan shafts of rear-wheel driven or four-wheel driven motor vehicles.

The invention moreover relates to a method for producing a tripod joint comprising the following method steps:

The following is provided: an outer joint member, with several circumferentially distributed axially extending elongate tracks formed therein; an inner joint member with several circumferentially distributed radial axle journals, and at least a number of rollers corresponding to the number of journals, wherein the roller is respectively pivotably retained with a central bore on the associated axle journal and is in engagement with the elongate tracks, and wherein the roller is displaceable in the track in the axial direction of the outer joint member; wherein each axle journal comprises on its circumference two outer diametrically opposed spherical end faces for engagement into the bore of the roller; and wherein the bore has a cylindrical portion for engagement with the spherical end faces in order to support the roller so as to be displaceable relative to the journal, and at least a constricted portion that is adjacent thereto in the axial direction, while forming a continuous transition, on one side of the cylindrical portion and that reaches behind the spherical end faces, for limiting the displacing movement.

The method moreover comprises a step of placing the rollers on the journals by a pivoting movement of the rollers, for example by one of the diametrically opposed spherical end faces of the journal being brought into engagement with the cylindrical portion of the inner ring, in the process reaching behind the inner constricted portion thereof, and then being pivoted in such a way that the second spherical end face comes into engagement also with the cylindrical portion of the inner ring, so that the inner constricted portion reaches behind both spherical end faces and that the roller oriented perpendicularly to the extent of the journal is retained against being pulled off in the extending direction of the journal.

The method according to the invention moreover comprises the step of introducing the rollers into the tracks of the outer joint member, wherein at least one of the rollers carries out a displacing movement relative to the journal limited by the at least one constricted portion at least during a relative pivoting between the inner and the outer joint member.

The providing step moreover comprises the providing of rollers comprising an outer ring, an inner ring having the bore, and rolling elements interposed therebetween, wherein the outer ring is displaceable relative to the inner ring in the axial direction, and the step of introducing the roller comprises the displacement of at least one outer ring relative to the associated inner ring.

BRIEF DESCRIPTION OF THE DRAWINGS

The invention as well as the technical environment are explained in more detail below with reference to the figures. It must be remarked that the Figures depict a particularly preferred embodiment of the invention, but that it is not limited thereto. The Figures schematically show.

DETAILED DESCRIPTION

Figure 1:
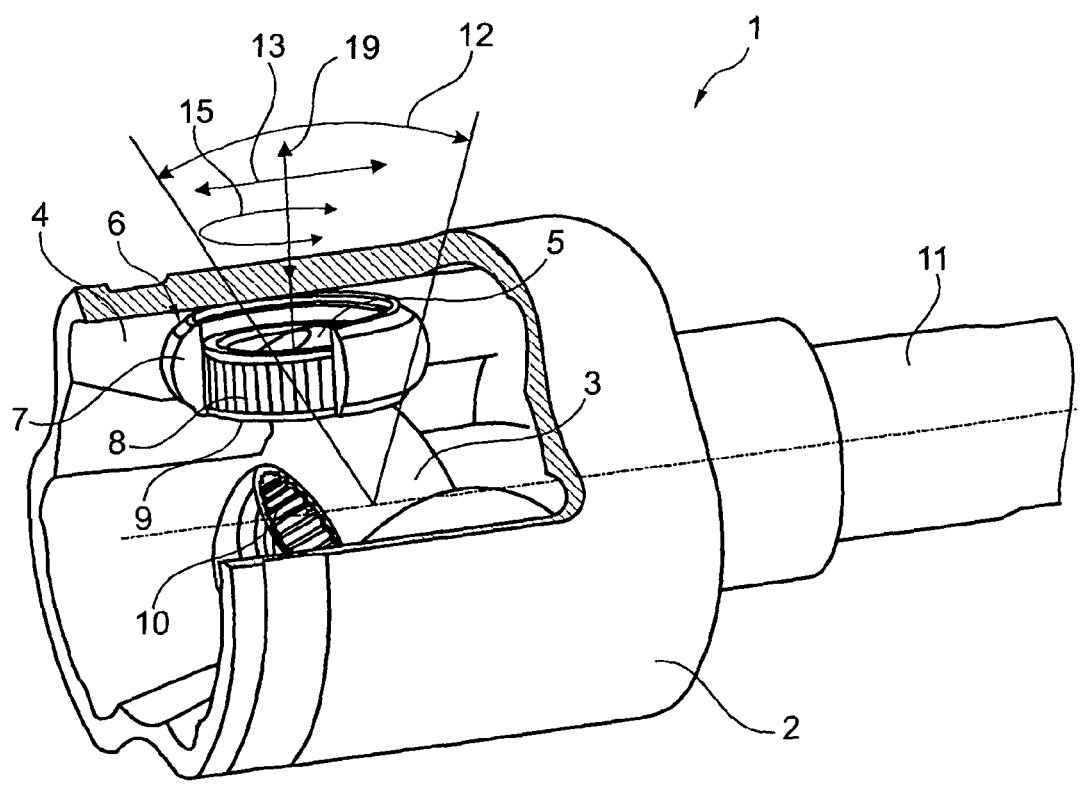
FIG. 1: a perspective partial cross-sectional view of a first exemplary embodiment of a tripod joint 1 according to the invention.
Figure 2:
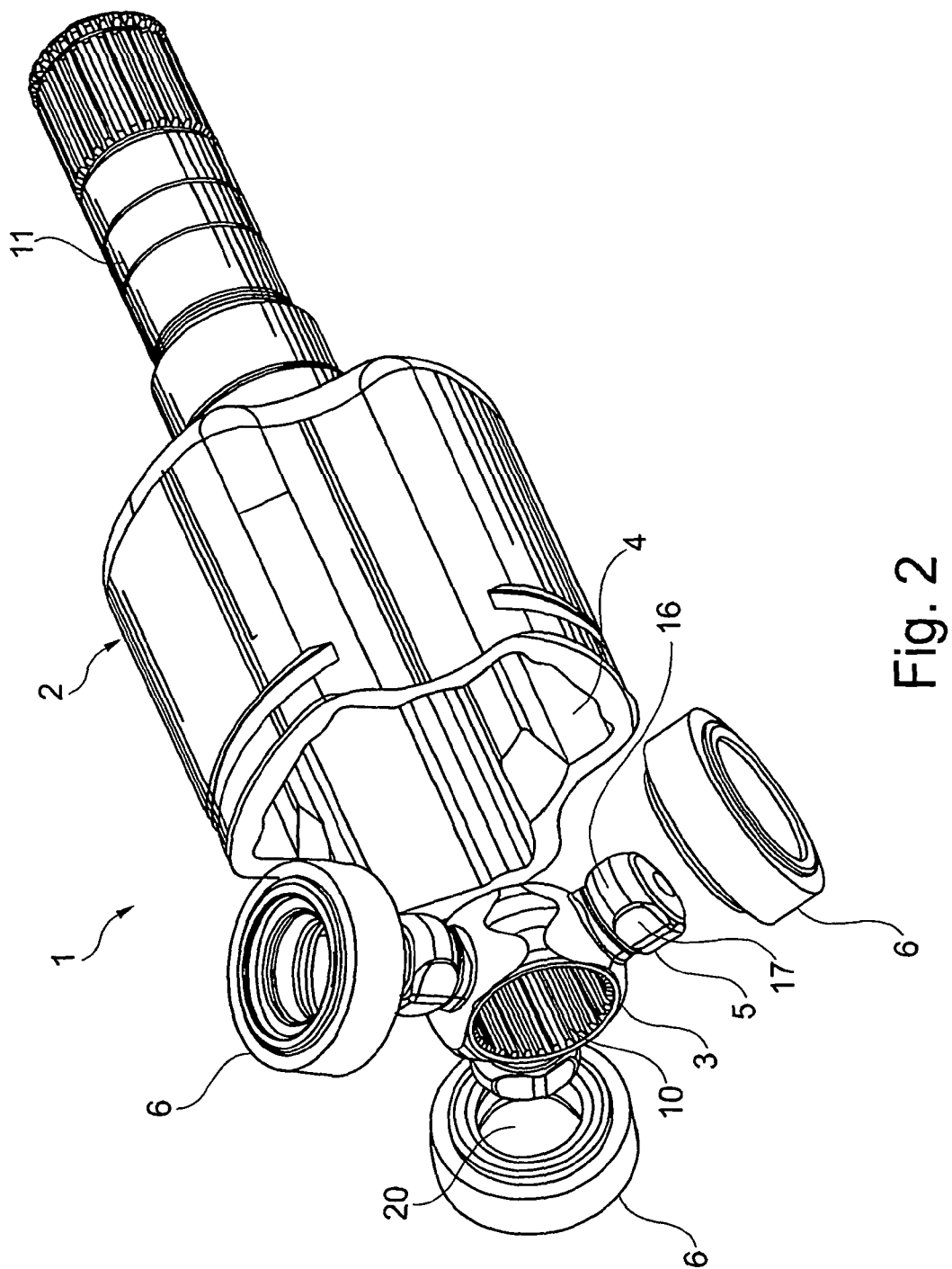
FIG. 2: an exploded view of the tripod joint according to the invention from FIG. 1.

In a schematic representation, FIGS. 1 and 2 show an exemplary embodiment of a tripod joint 1 according to the invention in a perspective view and exploded view, respectively. The outer joint member 2 comprises an axis of rotation defining the axial direction of the outer joint member and is opened on one side. At its closed end, the outer joint member 2 leads into a shaft 11 for connection to, for example, a drive output shaft, which is not shown, of a transmission of a motor vehicle. Three tracks 4 extending along the axial direction are formed in the outer joint member 2. Each track 4 forms two running surfaces disposed opposite from each other, on which the rollers 6 inserted into the track 4 roll, one of which rollers is shown in FIG. 1 in a sectional view for illustration purposes. The roller 6 comprises an inner ring 9, an outer ring 7 which is engagement with the track 6, and needles 8 interposed between the rings 7, 9 as rolling elements. As is further apparent from FIG. 1, each roller 6 is retained on a journal 5 of the inner joint member 3, which is also referred to as tripod star and which is inserted into the outer joint member 2. As FIG. 2 shows, the journal 5 comprises two diametrically opposed spherical end faces 16 for engagement with the inner surface of the bore 20 of the respective inner ring 9 of the roller 6. In order to facilitate assembly, the journal 5 is flattened between the spherical end faces 16 in the circumferential direction.

These flattened portions 17 permit the placement of the rollers 6 by a pivoting movement. Once they are in engagement with the inner ring 9, this "partially spherical" design of the journals 5 permit, among other things, a pivoting of the rollers 6 relative to the journals 5.

The tripod star 3 has an inner recess 10 in whose inner wall a plurality of splines is formed for connection of a connecting shaft not shown, for example to a fixed ball joint. The axis of rotation of the shaft or of the inner joint member 3 defines the axial direction of the inner joint member 3. As is shown in FIG. 1, the joint 1 enables bending between the shaft 11 and the axis of rotation of the inner joint member 3, the pivoting degree of freedom is indicated by the arrow 12. In the bent position, the journals 5, during the rotation of the joint 1, execute an oscillating movement in the tracks 4 indicated by the double arrow 13. At the same time, the outer rings 7 of the rollers 6 rotate about their inner rings 9, as the double arrow 15 illustrates. The special configuration of the bore 20 of the inner rings 9, which is described below, permits a displacement of the inner rings relative to the journal in the radial direction of the outer joint member 2, as is indicated by the arrow 14.

Figure 3:
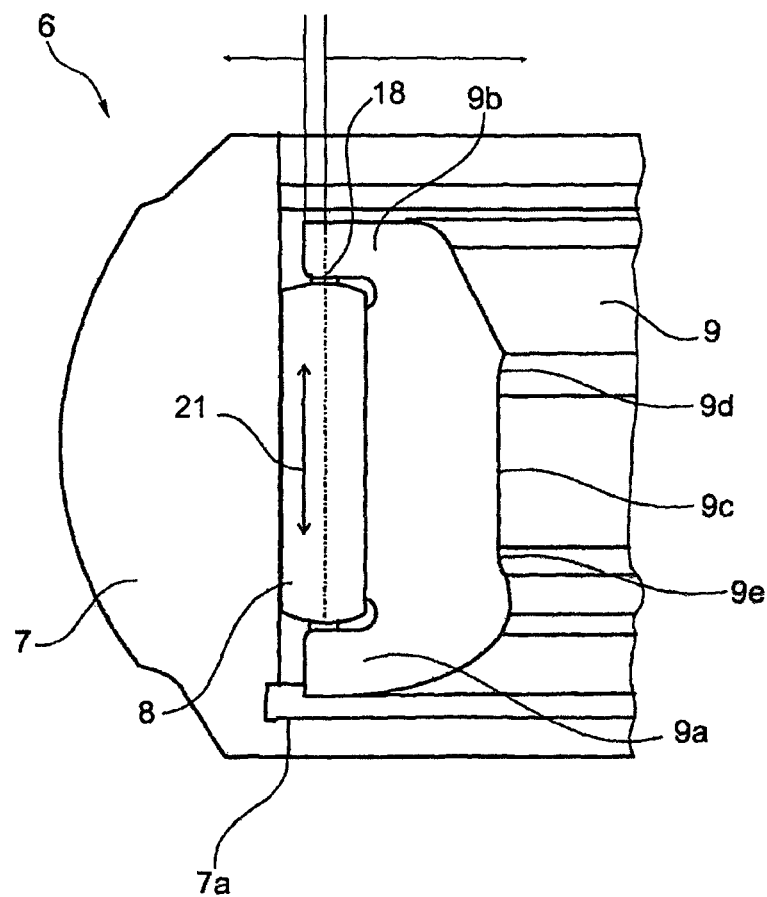
FIG. 3: a cross-sectional view of the roller 6 of the tripod joint 1 according to the invention from FIG. 1, FIG. 4: a cross-sectional view for illustrating the bore geometry of the inner ring of the roller of the tripod joint according to the invention from FIG. 1.

An additional displaceability 19 of the outer ring 7 relative to the inner ring 9 in the direction parallel to their axis of rotation results from its design configuration, which can be seen in FIG. 3. The inner ring 9 defines a running surface for the needles 8 as rolling elements. The rolling elements 8 are kept in the running track by collar-like projections 9a, 9b running peripherally along the edge of the outer circumference. The collar-like projections 9a, 9b are configured so as to respectively form an almost point-shaped contact surface in the center 18 of their end faces, i.e. in the axis of rotation. The inner circumferential surface of the outer ring 7, which forms a running surface together with the rolling elements 8, has an extent exceeding the width of the needles 8 and enables a displacement of the outer ring 7 relative to the needles 8, parallel to their rolling direction. In the non-assembled state of the joint 1, this displacing movement is limited only in one direction by the unilateral collar-like projection 7a on the outer ring 7.

Figure 4:
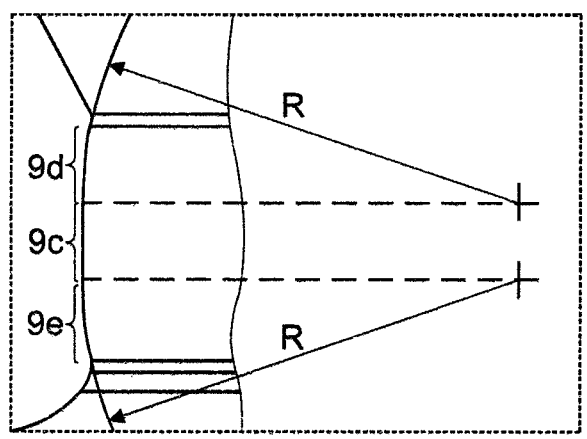

It becomes clear from FIG. 4 that the inner circumferential surface provided by the bore 20 in the inner ring 9, which is in engagement with the spherical end faces 16 of the journal 5 from FIG. 2, comprises three portions. A middle cylindrical portion 9c as well as two constricted portions 9d, 9e that are continuously adjacent to this portion 9c. These concavely formed constricted portions 9d and 9e defined by spherical surfaces reach behind the spherical end faces 16 of the journals 5 if the axes of rotation of the roller 6 concerned are oriented parallel to the axial direction of the journals 5. Only upon exceeding a predetermined degree of pivoting of the roller 6 relative to the journal 5 does the journal 5 come out of engagement, and the roller 6 can be separated from the journal 5. Given a corresponding orientation of the rollers 6 in a predetermined pivoting range about this previously mentioned parallel orientation, it is thus fixed on the journal 5. The cylindrical portion 9c provides for a cylinder/spherical contact between the journal 5 and the inner ring 9; at the same time, a displaceability of the inner ring 9 relative to the journal 5 in the extension direction of the journal 5 is enabled.

The invention claimed is:

1. A tripod joint, comprising
an outer joint member with several axially extending elongate tracks formed therein and distributed over the inner circumference thereof;
an inner joint member with several radial axle journals distributed over the outer circumference thereof;
at least a number of rollers corresponding to the number of axle journals, wherein the roller is respectively pivotably retained with a central bore on the associated axle journal and is in engagement with the elongate tracks, wherein the roller is displaceable in the associated track in the axial direction of the outer joint member;
wherein each axle journal comprises on its circumference two outer diametrically opposed convexly curved end faces for engagement into the bore;
wherein the bore has a cylindrical portion for engagement with the convexly curved end faces in order to support the roller, and at least a constricted portion that is adjacent thereto in the axial direction, and
wherein the constricted portion is disposed in such a way that, at least in one position of the tripod joint, the constricted portion rests against the axle journal,
wherein the roller comprises an outer ring, an inner ring having the bore, and rolling elements interposed therebetween, and
wherein the outer ring is displaceable relative to the inner ring in the axial direction of the axle journal and the inner ring is displaceable relative to the axle journal, and
wherein the maximum displacement of the inner ring relative to the axle journal in the axial direction of the axle journal is smaller than the maximum displacement of the outer ring relative to the inner ring in the axial direction of the axle journal.

2. The tripod joint according claim 1, wherein the constricted portion is formed by a concavely curved, surface-shaped, region.

3. The tripod joint according to claim 1, wherein the constricted portion is formed complementary to the associated convexly curved end face.

4. The tripod joint according to claim 1, wherein the ratio of the radius of curvature of the constricted portion and the radius of curvature of the associated convexly curved end face is between 1.00 and 1.01, with the range boundaries being included in each case.

5. The tripod joint according to claim 1, wherein the bore comprises two constricted portions that are adjacent thereto in the axial direction, while forming a continuous transition, on one side of the cylindrical portion, and that reach behind the associated convexly curved end face, for limiting a displacing movement.

6. The tripod joint according to claim 1, wherein the maximum possible displacement of the rolling elements relative to the inner ring in the axial direction is smaller than the maximum possible displacement in the axial direction of the rolling elements relative to the outer ring.

7. The tripod joint according to claim 1, wherein the rolling elements are needles and the movement of the needles in the axial direction, relative to their rolling movements, is limited by collar-like projections on the inner ring and/or the outer ring.

8. The tripod joint according to claim 7, wherein the collar-like projections form, in the centre of the axial end face of the needles, a contact surface therewith.

9. The tripod joint according to claim 8, wherein the end faces of the needles have a convex shape.

10. The tripod joint according to claim 1, wherein the joint is disposed in a motor vehicle.

\* \* \* \* \*